United States Patent Office 3,186,972
Patented June 1, 1965

3,186,972
POLYMERIC MALEIC ANHYDRIDE AND METHOD OF MAKING
John L. Lang, Murrysville, Pa., and William A. Pavelich, Lenexa, Kans., assignors to The Dow Chemical Company, Midland, Mich., a corporation of Delaware
No Drawing. Filed Jan. 16, 1961, Ser. No. 82,681
1 Claim. (Cl. 260—78.4)

This invention concerns polymeric maleic anhydride and a method of making the same. It relates more particularly to maleic anhydride homopolymer of high molecular weight and a method for making the same.

Attempts to prepare polymeric maleic anhydride previously reported have all resulted in failure or in the yield of a product of low molecular weight. For example, Marvel, Prill and Detar, J. Am. Chem. Soc., vol. 69, pages 52–8 (1947), heated maleic anhydride with benzoyl peroxide and obtained a product characterized as being mainly cyclic trimer. Lustig and Wachtel, Biochem. Zeit., vol. 298, pages 330–339 (1938) irradiated maleic acid with beta rays from radium and found that polymerization of the maleic anhydride did not occur.

It has now been discovered that maleic anhydride can readily be polymerized to produce a homopolymer of relatively high molecular weight, e.g., a polymer having an intrinsic viscosity of at least 0.05 deciliter per gram or greater, as determined in 2-butanone, by irradiating the maleic acid in a non-solid non-gaseous form, i.e. in liquid form or in solution, such as dissolved in a non-polymerizable liquid, with high energy ionizing radiation such as gamma rays or X-rays of an intensity of at least 10,000 rads per hour and for a total dose of from about 2 to about 60 megarads.

The polymerization can be carried out while having the maleic anhydride dissolved in a solvent, preferably an organic solvent, such as acetic anhydride, benzene, toluene, dioxane and the like, and at temperatures between about 10° and 100° C., or the liquid maleic anhydride can be irradiated at temperatures of about 60° C. or above, and at atmospheric or superatmospheric pressure.

The high energy ionizing radiation is conveniently radiation from cobalt 60, but other sources of gamma radiation such as cesium 137, or X-rays can be used.

In practice, the maleic anhydride in non-solid non-gaseous condition, preferably dissolved in a solvent, e.g., acetic anhydride, is subjected to irradiation by gamma or X-rays of an intensity of at least 10,000 rads per hour, suitably an intensity of from 10,000 to 500,000 or more rads per hour for a dose of from about 2 to 60 megarads, at temperatures between about 10° and 100° C. and at atmospheric, subatmospheric or superatmospheric pressures, to polymerize the maleic anhydride. The polymer is recovered in usual ways, e.g., by precipitation in a non-solvent such as toluene, filtration, washing and drying. The polymer is soluble in water and organic solvents such as alcohols, ethers, ketones, acetic anhydride, esters, acetonitrile and nitroethane. It is useful as an intermediate in the preparation of compositions such as adhesives, polymeric esters or for the deposition of tacky films.

The following examples illustrate ways in which the principle of the invention has been applied, but are not to be construed as limiting its scope.

EXAMPLE 1

A charge of 50 grams of a 50 weight percent solution of maleic anhydride dissolved in acetic anhydride was sealed in a heavy walled glass tube. The tube and its contents were subjected to the action of gamma rays from cobalt 60 in a field having an intensity of 200,000 rads per hour for a period of 100 hours. The resulting solution was diluted with methyl ethyl ketone, then was mixed with toluene. A precipitate of polymeric product was obtained. It was separated by filtration and was dried. The polymer was a yellow powder having a molecular weight of 23,000 as determined by the light scattering method. It was soluble in water.

EXAMPLE 2

In each of two experiments, a charge of 50 grams of a 50 weight percent solution of maleic anhydride dissolved in a solvent was irradiated with gamma rays from cobalt 60 in a field of 195,000 rads per hour intensity for a period of 200 hours. In Experiment A the solvent was acetic anhydride. In Experiment B the solvent was benzene. The polymer was recovered by precipitation in toluene, filtration, washing and drying the same. The yield of polymer in each experiment was 85 percent based on the weight of the maleic anhydride starting material. The polymer from each experiment had an intrinsic viscosity of about 0.12, determined in 2-butanone. Similar results were obtained employing the maleic anhydride in concentrations of 10 and 25 percent by weight in said solvents, except that the polymer had a lower intrinsic viscosity. At 10 percent concentration of the maleic anhydride in the solvent the polymer had an intrinsic viscosity of 0.052, and at 25 percent concentration the polymer had an intrinsic viscosity of about 0.078, determined in 2-butanone.

EXAMPLE 3

In each of a series of experiments, a charge of 50 grams of a 50 weight percent solution of maleic anhydride dissolved in acetic anhydride was sealed in a glass ampoule and was irradiated with gamma rays from cobalt 60 at an intensity of 195,000 rads per hour for a total dose in megarads as stated in the following table. The polymer was recovered by precipitation in toluene, filtration and drying. Table I identifies the experiments and gives the time for which the polymerization was carried out, the total dose of irradiation and the conversion or percent yield of polymer, based on the weight of the maleic anhydride starting material.

Table I

| Run No. | Intensity, rads/hr. | Total Dose, Megarads | Time, Hrs. | Temp., ° C. | Polymer, Yield Percent |
| --- | --- | --- | --- | --- | --- |
| 1 | 195,000 | 5.68 | 24 | Ambient | 17 |
| 2 | 195,000 | 11.36 | 48 | ___do___ | 39 |
| 3 | 195,000 | 16.38 | 84 | ___do___ | 55 |
| 4 | 195,000 | 39.00 | 200 | ___do___ | 87 |

EXAMPLE 4

In each of a series of experiments, a charge of 50 grams of a 50 weight percent solution of maleic anhydride dissolved in acetic anhydride was irradiated with gamma rays from cobalt 60 at an intensity in rads per hour as stated in the following table and for a total dose as stated therein. The polymer was recovered by precipitation in toluene, filtration and drying. Table II identifies the experiments and gives the conversion or percent yield of polymer, based on the weight of the maleic anhydride starting material.

Table II

| Run No. | Radiation | | Time, Hrs. | Temp., °C. | Polymer, Yield Percent |
|---|---|---|---|---|---|
| | Intensity, rads/hr. | Total Dose, Megarads | | | |
| 1 | 10,000 | 2 | 200 | Ambient | 10 |
| 2 | 50,000 | 2 | 40 | do | 10 |
| 3 | 50,000 | 5 | 100 | do | 27 |
| 4 | 480,000 | 7.5 | 16 | do | 22 |
| 5 | 480,000 | 14 | 29 | do | 39 |
| 6 | 195,000 | 5 | 25.5 | do | 15 |
| 7 | 195,000 | 9 | 46 | do | 31 |
| 8 | 195,000 | 17 | 87 | do | 56 |
| 9 | 195,000 | 28 | 145 | do | 62 |
| 10 | 195,000 | 39 | 200 | do | 87 |

EXAMPLE 5

A charge of 50 grams of a 50 weight percent solution of maleic anhydride dissolved in acetic anhydride was sealed in a glass ampoule and was irradiated with gamma rays from cobalt 60 at an intensity of 480,000 rads per hour for a period of 99.7 hours. The yield of polymer was 56 percent based on the maleic anhydride starting material. In a similar experiment carried out at ambient cave temperature, the yield of polymer was 55 percent. In a similar experiment maleic anhydride (M.P. 53° C.) was sealed in a glass ampoule, then heated to 75° C. and irradiated with gamma rays at 480,000 rads per hour intensity for a period of 99.7 hours. The yield of polymer was 14 percent.

EXAMPLE 6

A charge of 50 grams of a 50 weight percent solution of maleic anhydride dissolved in dioxane was sealed in a glass ampoule and irradiated with gamma rays from cobalt 60 at an intensity of 205,000 rads per hour for a total dose of 20 megarads. The polymer was recovered in amount corresponding to a yield of 15 percent, based on the maleic anhydride starting material.

EXAMPLE 7

In a series of experiments, a charge of 50 grams of a 50 weight percent solution of maleic anhydride dissolved in acetic anhydride, together with zero, 0.1 and 1.0 percent by weight, respectively, of quinone, based on the weight of the maleic anhydride. The solutions were irradiated with gamma rays from cobalt 60 at 100,000 rads per hour intensity for a total dose of 4.8 megarads. The polymer was recovered by precipitation in toluene, filtration and drying. The yields of polymer were 18.6, 18.6 and 18.1 percent, respectively, based on the weight of the maleic anhydride starting material.

We claim:

Homopolymer of maleic anhydride having an intrinsic viscosity of at least 0.05 deciliter per gram as determined in 2-butanone.

References Cited by the Examiner

UNITED STATES PATENTS

| 2,254,382 | 9/41 | Neher | 260—78.4 |
| 2,297,351 | 9/42 | Gerhart | 260—158 |
| 2,634,256 | 4/53 | Sparks et al. | 260—78.4 |
| 2,955,994 | 10/60 | Guthrie et al. | 260—158 |

JOSEPH L. SCHOFER, *Primary Examiner.*

J. R. SPECK, *Examiner.*